United States Patent
Danz et al.

(10) Patent No.: US 8,655,551 B2
(45) Date of Patent: Feb. 18, 2014

(54) METHOD AND DEVICE FOR THE ASSISTED PARKING OF A MOTOR VEHICLE

(75) Inventors: Christian Danz, Stuttgart (DE); Jan Egelhaaf, Leonberg (DE); Wei-Chia Lee, Leonberg (DE); Benjamin Steiner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1882 days.

(21) Appl. No.: 11/628,699

(22) PCT Filed: Apr. 6, 2005

(86) PCT No.: PCT/EP2005/051526
§ 371 (c)(1),
(2), (4) Date: Aug. 20, 2007

(87) PCT Pub. No.: WO2005/120932
PCT Pub. Date: Dec. 22, 2005

(65) Prior Publication Data
US 2008/0077294 A1    Mar. 27, 2008

(30) Foreign Application Priority Data
Jun. 5, 2004 (DE) .......................... 10 2004 027 640

(51) Int. Cl.
*B60W 30/06* (2006.01)

(52) U.S. Cl.
USPC ............... 701/44; 342/71; 180/167; 180/169; 701/36; 701/41

(58) Field of Classification Search
USPC ........... 701/41, 36, 44; 342/71; 180/167, 168, 180/169
See application file for complete search history.

(56) References Cited

U.S. PATENT DOCUMENTS

| | | | |
|---|---|---|---|
| 4,931,930 A * | 6/1990 | Shyu et al. | 701/36 |
| 6,476,730 B2 * | 11/2002 | Kakinami et al. | 340/932.2 |
| 6,483,429 B1 * | 11/2002 | Yasui et al. | 340/435 |
| 6,483,442 B2 * | 11/2002 | Shimizu et al. | 340/932.2 |
| 6,587,760 B2 * | 7/2003 | Okamoto | 701/1 |
| 6,611,744 B1 * | 8/2003 | Shimazaki et al. | 701/41 |
| 6,621,421 B2 * | 9/2003 | Kuriya et al. | 340/932.2 |
| 6,906,640 B2 | 6/2005 | Gotzig et al. | |
| 7,053,795 B2 | 5/2006 | Maemura et al. | |
| 2003/0090570 A1 * | 5/2003 | Takagi et al. | 348/148 |
| 2004/0130464 A1 * | 7/2004 | Schindler et al. | 340/932.2 |
| 2004/0204807 A1 * | 10/2004 | Kimura et al. | 701/36 |
| 2004/0260439 A1 * | 12/2004 | Endo et al. | 701/36 |
| 2006/0136109 A1 * | 6/2006 | Tanaka et al. | 701/41 |
| 2007/0282504 A1 * | 12/2007 | Luke et al. | 701/44 |

FOREIGN PATENT DOCUMENTS

| | | |
|---|---|---|
| DE | 196 46 559 | 5/1998 |
| DE | 198 09 416 A1 | 9/1999 |
| DE | 101 09 680 | 10/2001 |
| DE | 101 36 410 | 2/2002 |

(Continued)

*Primary Examiner* — Stephen Holwerda
(74) *Attorney, Agent, or Firm* — Kenyon & Kenyon LLP

(57) ABSTRACT

A method and a device for the assisted parking of a motor vehicle into a parking space are provided. The method comprises the following method steps: approaching the parking space; measuring the parking space using sensors situated on the motor vehicle; calculating a setpoint parking path and indicating the setpoint parking path on a display; indicating the actual parking path on the display such that the actual parking path may be adapted to the setpoint parking path.

18 Claims, 11 Drawing Sheets

(56) References Cited

FOREIGN PATENT DOCUMENTS

| | | |
|---|---|---|
| DE | 102 20 427 | 11/2003 |
| DE | 103 38 255 | 3/2004 |
| DE | 601 01 788 | 11/2004 |
| DE | 10 2004 014 357 | 10/2005 |
| EP | 1 361 458 | 11/2003 |
| JP | 11-157404 | 6/1999 |
| JP | 2001-010431 | 1/2001 |
| JP | 2001-315600 | 11/2001 |
| JP | 2004-99015 | 4/2004 |
| JP | 2004-114879 | 4/2004 |
| JP | 2005 262925 | 9/2005 |
| JP | 2005 286154 | 10/2005 |

* cited by examiner

METHOD AND DEVICE FOR THE ASSISTED PARKING OF A MOTOR VEHICLE

FIELD OF THE INVENTION

The present invention relates to a method and a device for the assisted parking of a motor vehicle into a parking space.

BACKGROUND INFORMATION

Driver assistance systems are known from practice, which assist a driver of a motor vehicle in maneuvering, in parking and/or in leaving a parking space and which include a sensor system that detects the surroundings of the motor vehicle and that may have ultrasonic sensors for this purpose. In particular, systems are known, which include a parking space measuring device of a motor vehicle and which use this to assist the driver when parking into a parking space.

For example, a parking assistant is known from German Published Patent Application No. 198 09 416, which assists the driver when parallel parking by backing into a parking space between two vehicles parked at the edge of a road. In the method implemented in this system, a potential parking space is approached and measured by the sensors situated on the motor vehicle. Subsequently, an ascertainment is made as a function of stored reference values as to whether the parking space is sufficiently large for a parking operation of the motor vehicle. If this is the case, then a parking strategy is calculated as a function of the size of the parking space and is communicated to the driver of the motor vehicle. The driver may then follow the proposed parking strategy so as to avoid long and/or unsuccessful parking operations.

It is fundamentally important whether the motor vehicle at the beginning of a parking operation is oriented parallel to the alignment of the motor vehicles adjoining the parking space or parallel to the adjoining curb. If this is not given, then the specification of a parking strategy in the latter case includes a correction of the alignment, i.e. of the yaw angle, between the longitudinal axis of the vehicle and the curb. Following the conclusion of the parking operation, the vehicle is aligned parallel to the curb, i.e. the yaw angle is 0°.

A provision was made to calculate a parking path using so-called clothoids. The yaw angle is corrected by shortening or lengthening the first circular arc that must be followed when parking and that has a so-called starting clothoid assigned to it. If the surfaces below the steering angle characteristics represented by the starting clothoid and a so-called turning clothoid are of equal size, then it is possible to speak of a so-called parallel parking process since in this case the integration of the steering angle characteristics states the yaw angle. If now the first circular arc that must be followed is changed, then the vehicle may be parked parallel to the curb even if the initial yaw angle deviates from 0°.

Furthermore, there is the problem in a parking operation that after passing the parking space the motor vehicle is usually oriented obliquely with respect to the curb since it is often difficult for the driver to move the motor vehicle parallel with respect to the curb. This oblique position must then be corrected during the parking operation. When varying the first circular arc that must be followed to correct the initial yaw angle, i.e. when changing the arc length of the so-called trajectory, the motor vehicle may possibly collide with motor vehicles adjoining the parking space. Thus, to avoid such collisions, a very costly calculation strategy would have to be employed to take into account the initial yaw angle.

SUMMARY OF THE INVENTION

The object of the present invention is to create a method and a corresponding device, optimized with respect to the related art, for the assisted parking of a motor vehicle into a parking space.

In the method according to the present invention for the assisted parking of a motor vehicle into a parking space, the parking space is approached and measured by sensors situated on the motor vehicle. On this basis, a setpoint parking path is calculated and shown on a display. At the same time, the actual parking path is shown on the display during the parking operation so that the actual parking path may be adapted to the setpoint parking path.

The method according to the present invention makes it easier for the driver of the respective motor vehicle to understand the parking operation and communicates the correct parking procedure to the driver by the visual indication on the display. A display already existing in the motor vehicle, for example a display of a navigation system, may be used for this purpose.

The method according to the present invention may be activated by a driver of the respective vehicle, for example, if the driver wants to be assisted when parallel parking by backing into a parking space between two vehicles parked at the edge of a road. For this purpose, initially the length of the parking space may be ascertained when first driving by alongside the parking space in a forward direction using suitable distance sensors, which take the form of ultrasonic sensors, for example. At the same time, the route traveled by the vehicle may be continually recorded. Once the parking space has been passed, the driver may then be asked to stop and to back up. By using the method according to the present invention or a system utilizing this method it is then possible to provide continuous support to the driver during the backup process in order to park into the parking space with as little steering and maneuvering effort as possible and without collision. For this purpose, the steering, acceleration and braking operations are preferably performed by the driver of the respective vehicle himself.

For the driver of the motor vehicle to be able to follow the setpoint parking path as precisely as possible, in a preferred specific embodiment of the method according to the present invention, the maneuvers required for adhering to the setpoint parking path are preferably specified on the display. These maneuvers include steering, acceleration and braking operations, by which the actual parking path is adapted to the setpoint parking path, i.e. the respective so-called trajectories on the display are brought into superposition.

So as to impart to the driver as intuitive a representation of the parking operation as possible, the measured parking space together with the actual parking path and the setpoint parking path is preferably represented on the display in a schematic top view, i.e. in the manner of a so-called bird's eye view. Such an easy to interpret and transparent representation, by which the driver is able to see how he must steer, accelerate and/or brake, also increases customer acceptance and satisfaction.

To provide the driver with another safety instrument, the performed driving maneuvers may be confirmed, if performed correctly, in an acoustic and/or visual manner e.g. by a textual display in a text field or by the illumination of a colored display and/or haptically.

To be able to perform the measurement of the parking space and thus the calculation of the setpoint parking path in an optimized manner, the method according to the present invention may be designed in such a way that when passing the parking space an initial yaw angle of the motor vehicle is specified with respect to the extension of the parking space. For this purpose, the initial yaw angle is preferably already set when driving lengthwise past the parking space in such a way that the motor vehicle is optimally aligned with respect to the parking space, that is, already prior to the start of the actual parking operation.

In particular, in the case of a parking space that is aligned parallel to an edge of the road, the specified initial yaw angle is preferably approximately 0°. Thus, the motor vehicle is then aligned prior to the start of the parking operation parallel with respect to a curb for example. Passing a parking space in parallel also has a positive effect on picking up measurement data using the sensor system configured as an environmental sensor system since in the measurement of the parking space using ultrasonic waves there is a vertical reflection, which results in a shortening of the measuring distance and an increase of the measuring accuracy.

An orientation of the motor vehicle running parallel to the extension of the respective parking space also has the effect of already correcting an initial yaw angle while passing the parking space which then no longer needs to be taken into account when calculating the setpoint parking path. This significantly reduces the computational work for ascertaining the setpoint parking path. For setting the initial yaw angle, visual, acoustic and/or haptic signals are provided for the driver, for example, which guide the driver onto a path preferably aligned parallel to the edge of the road or the curb before the parking maneuver itself is started. The driver thus regulates the initial yaw angle.

For example, information may be provided for the driver on a display, which the driver can use to guide his motor vehicle back onto a straight passing path in the event that he deviated from this path. Of course, for this purpose, any other suitable so-called human machine interface (HMI) may be used as well, which works according to a visual, acoustic or haptic principle and indicates, for example, the current yaw angle between the longitudinal vehicle axis and the edge of the parking space such that the vehicle can still be aligned parallel to the edge of the parking space while passing the parking space lengthwise.

In the case of an acoustic HMI, the current yaw angle may be communicated, for example, via a stereo-capable radio system of the motor vehicle. Depending on the yaw angle, an appropriate tone is then transmitted to the driver via a left or a right loudspeaker. If no sound is generated, then the motor vehicle is already aligned parallel to the edge of the parking space within the scope of tolerances. In the case of a visual HMI, a malposition of the vehicle may be communicated to the driver on a display, it being possible to indicate a suggestion for a correctional maneuver using a colored arrow, for example.

In a specific embodiment of the method according to the present invention, the yaw angle may be maintained by using a so-called urban adaptive cruise control system, by which the distance with respect to other road users and to the edge of the road may be regulated and the vehicle alignment is performed as a function of roadside elevations by using an ultrasonic sensor system. In this connection, an actuator may be used as well, which controls the steering wheel of the motor vehicle and thus sets the yaw angle automatically. Thus it is also conceivable for the yaw angle to be set using an electronic control aid. In this case, the driver is thus not required to intervene actively in order to align the motor vehicle in an optimized manner.

The present invention has as its subject matter also a device for the assisted parking of a motor vehicle into a parking space. This device includes a sensor system, a control unit, a display, a steering angle sensor and a travel transducer, a setpoint parking path and an actual parking path being indicated on the display. The display concept provided by the device according to the present invention makes it easier for the driver of the motor vehicle to understand the parking process and the correct procedure when parking.

The device according to the present invention represents a parking assistance system, which is easy to interpret for a user and which can preferably be switched on even shortly before approaching a parking space and can be switched off at any time. Of course it is also conceivable to have the device according to the present invention switched in automatically.

In order to support the user of the device according to the present invention further with respect to the maneuvers performed, the device may include an acoustic transducer.

So as not to collide inadvertently with obstacles in the parking operation, for example, with motor vehicles adjoining the parking space, it is advantageous if the device includes distance sensor for detecting obstacles. These sensors can also be used in the case in which the parked motor vehicle stands too close to a neighboring motor vehicle. The driver may then be asked to bring the wheels into a straightforward position and to move the motor vehicle a bit so that it comes to rest at the center of the parking space.

Furthermore, the device according to the present invention may be configured in such a way that the estimated actual parking path is represented as a function of the current steering angle ascertained by the steering angle sensor. The driver is then urged to bring the estimated actual parking path to coincide with the setpoint parking path by appropriate steering movements.

DETAILED DESCRIPTION

Figure 1:
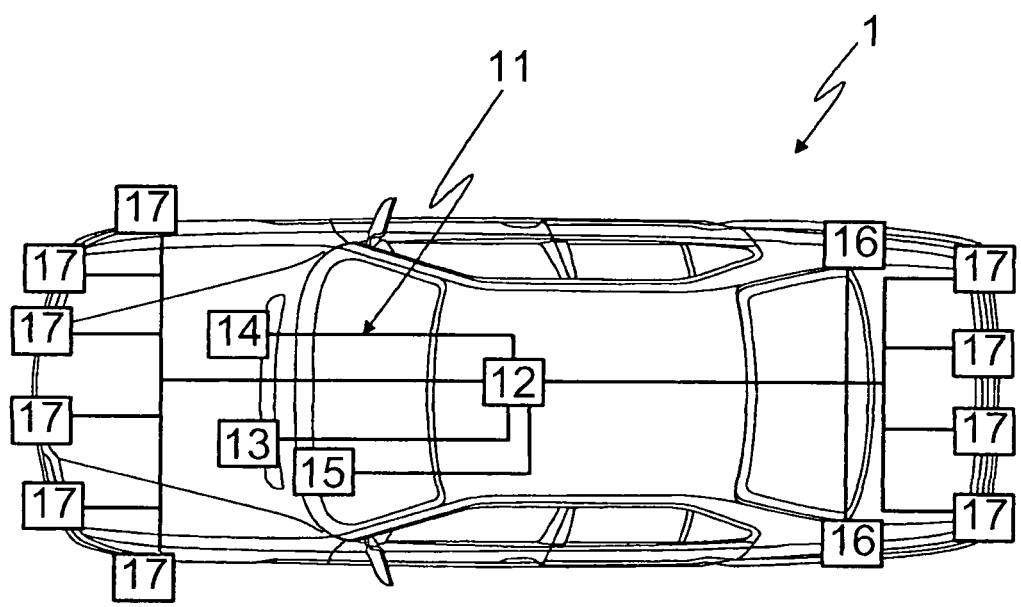
FIG. 1 shows a motor vehicle provided with a device according to the present invention.

FIG. 1 shows a motor vehicle 1, which is equipped with a device 11 for the assisted parking of a motor vehicle 1 into a parking space. Device 11 can also be used to implement the method according to the present invention.

Device 11 includes an electronic control unit 12, a travel transducer 13, for example, in the form of a wheel pulse counter (RIZ), a steering angle sensor 14, which, if indicated, may also have a yaw rate sensor assigned to it, as well as a so-called human machine interface 15 in the form of a display. Display 15 may be the display of a navigation system, of an instrument cluster or of a central display. Furthermore, device 11 is provided with sensors 16 in the form of ultrasonic sensors, which are situated on both sides of the vehicle in the region of a rear axle of motor vehicle 1, as well as with distance sensors 17 situated at the front and rear sides of the vehicle. Travel transducer 13, steering angle sensor 14, display 15, ultrasonic sensors 16 and distance sensors 17 are each connected to electronic control unit 12.

A parking operation that can be performed using device 11 is shown in FIGS. 2 through 8, the respective parking situation being represented for the driver of motor vehicle 1 on display 15 in a so-called bird's eye view. Represented for this purpose are, on the one hand, a parking space 20 selected for a parking operation and measured using ultrasonic sensors 16, and motor vehicle 1 in its current position X as well as in its position X' situated in parking space 20. In addition, a setpoint parking path 21 and an actual parking path 22 are represented on display 15. Further, the maneuver required to adhere to setpoint parking path 21 is displayed in written form and with the aid of arrows.

Figure 2:
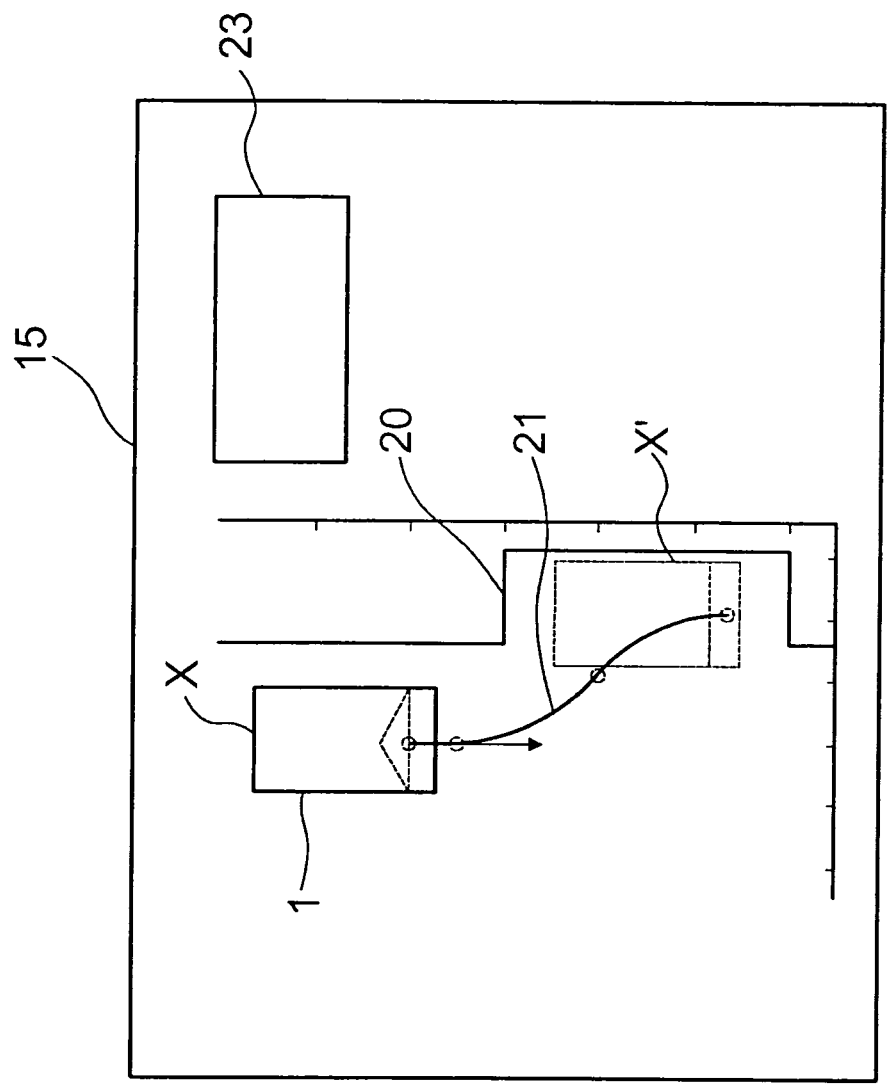
FIG. 2 shows a display indication during a first parking phase.
Figure 3:
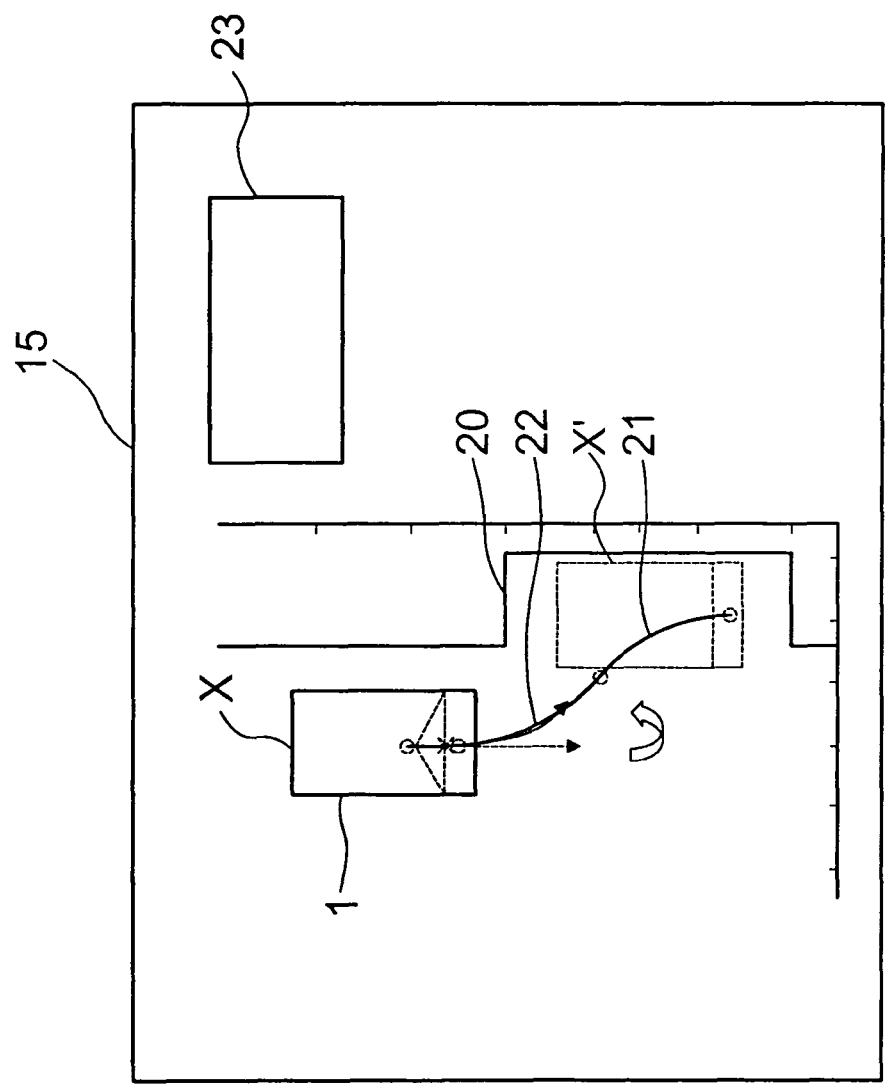
FIG. 3 shows a display indication during a second parking phase.
Figure 4:
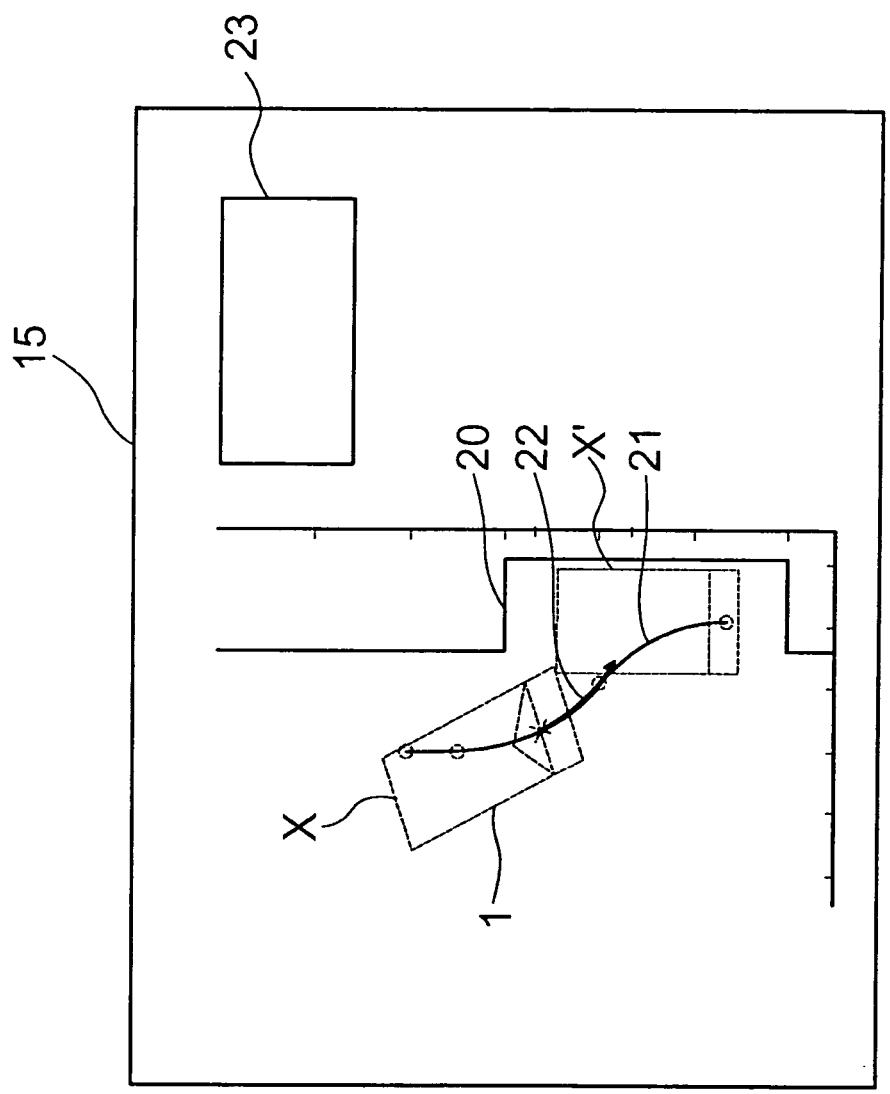
FIG. 4 shows a display indication during a third parking phase.
Figure 5:
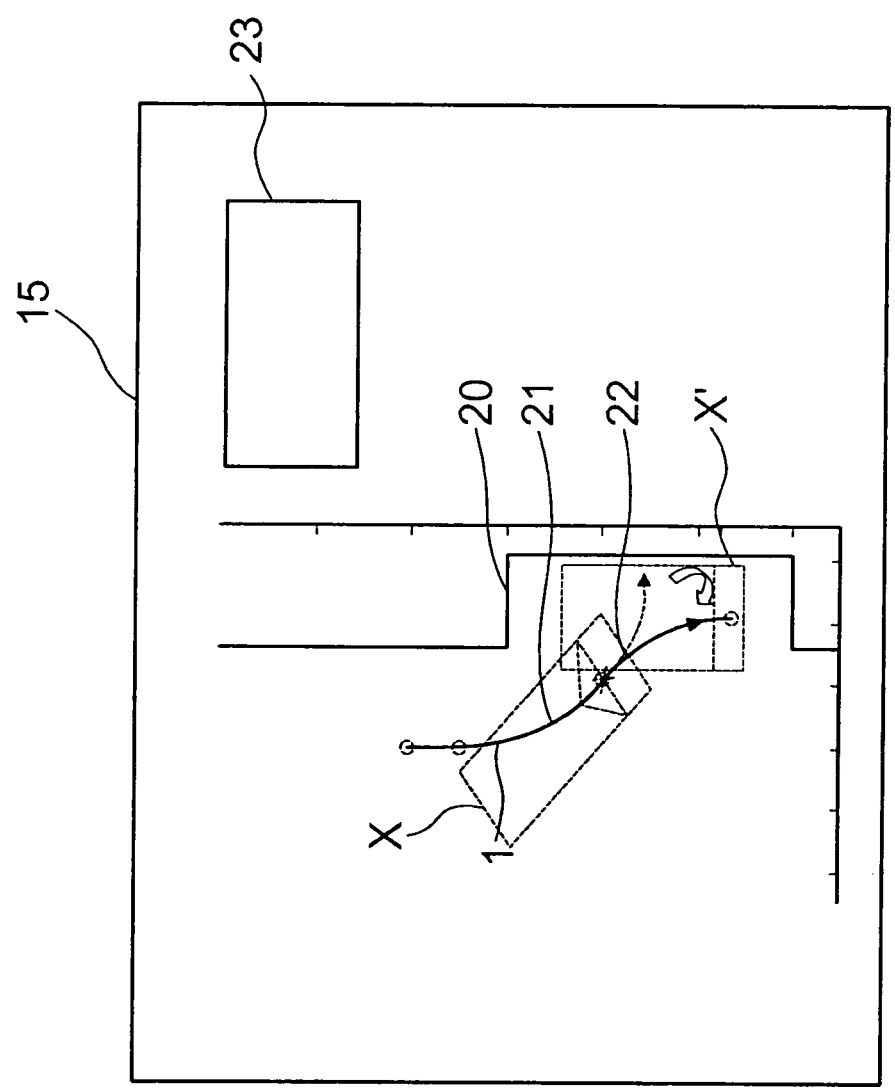
FIG. 5 shows a display indication during a fourth parking phase.

In the first parking phase shown in FIG. 2, the driver is asked to back up in a straight line by a suitable prompt in a text field 23 such as e.g. "BACK UP STRAIGHT". Thereupon the driver backs up motor vehicle 1 parallel to the alignment of parking space 20 until he arrives at a first steering reversal point and a signal is output or a gong sounds, as shown in FIG. 3. For this purpose, e.g. the instruction "BACK UP STRAIGHT UNTIL SIGNAL TONE SOUNDS" is displayed in text field 23. When the signal tone sounds, the driver stops the motor vehicle, whereupon display 15, as shown in FIG. 4, displays the request "TURN STEERING WHEEL TO THE RIGHT UNTIL SIGNAL TONE SOUNDS" in text field 23. Thus a first steering action occurs at a standstill.

Subsequently, the driver of the motor vehicle must now back up further at the set steering angle until a new signal tone or gong sounds. The driver is requested to do so by the instruction "BACK UP UNTIL SIGNAL TONE SOUNDS" in text field 23 of the display shown in FIG. 5.

Figure 6:
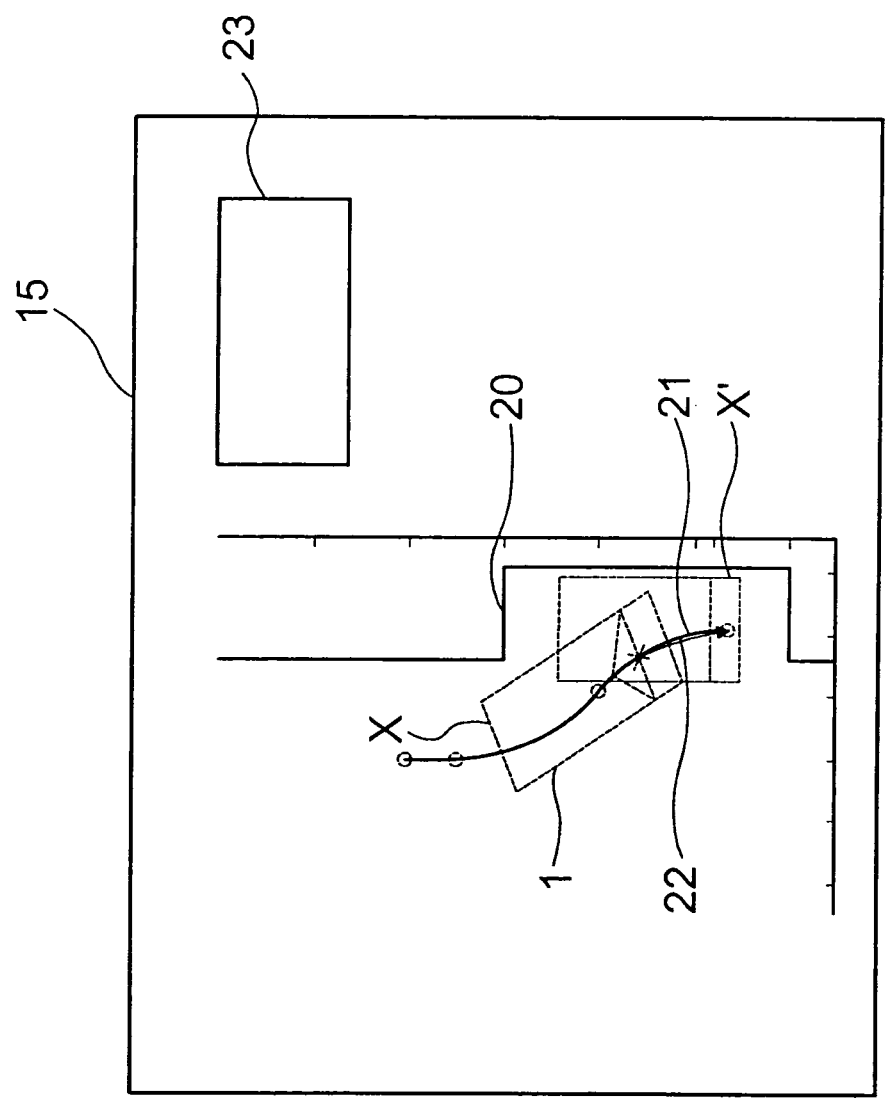
FIG. 6 shows a display indication during a fifth parking phase.

Once motor vehicle 1 has stopped, a second steering action is performed at a standstill, again a signal tone or gong sounding once the correct steering wheel position has been reached. The request to do so occurs with the instruction "TURN STEERING WHEEL TO THE LEFT UNTIL SIGNAL TONE SOUNDS" in text field 23 of display 15 as shown in FIG. 6.

Figure 7:
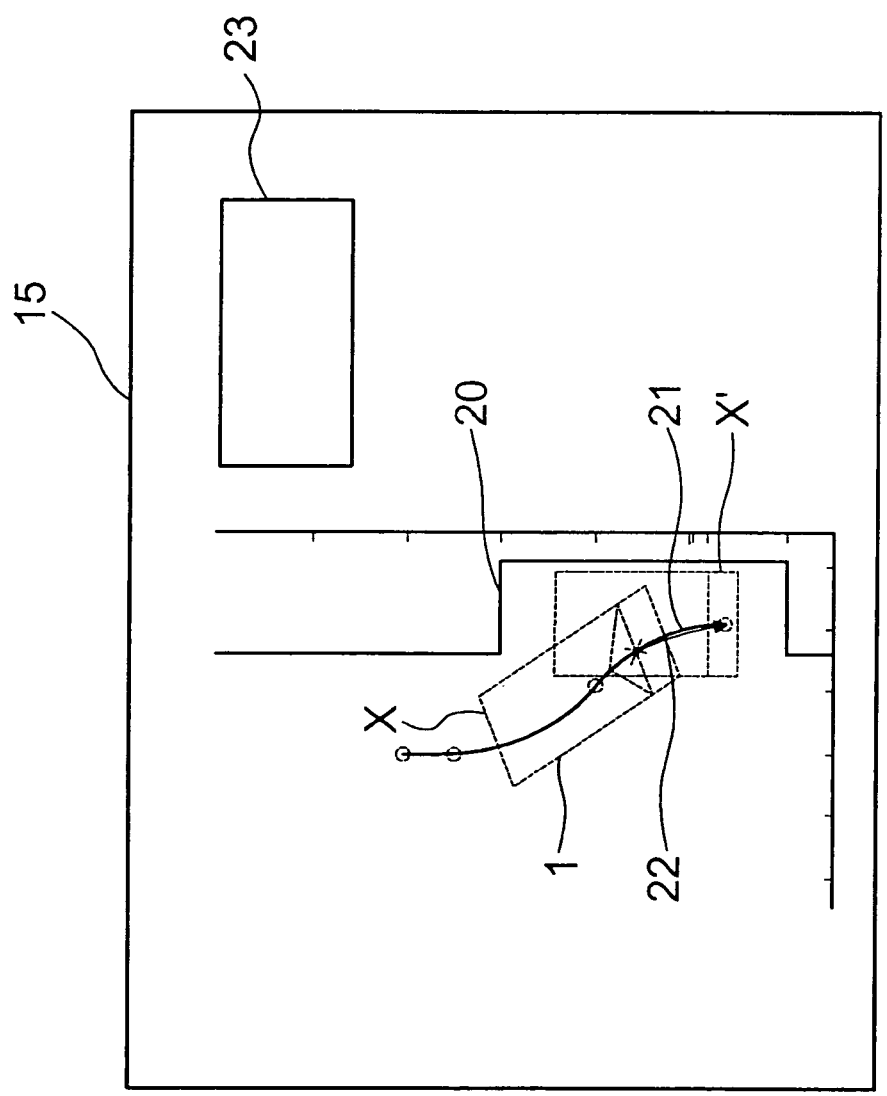
FIG. 7 shows a display indication during a sixth parking phase.

Once the corresponding movement of the vehicle has occurred, which can be seen on display 15 shown in FIG. 7, the parking operation concludes with the request in text field 23 "BACK UP UNTIL SIGNAL TONE SOUNDS". This backing up process until the renewed sounding of a signal tone occurs at the steering angle selected in the preceding step.

Figure 8:
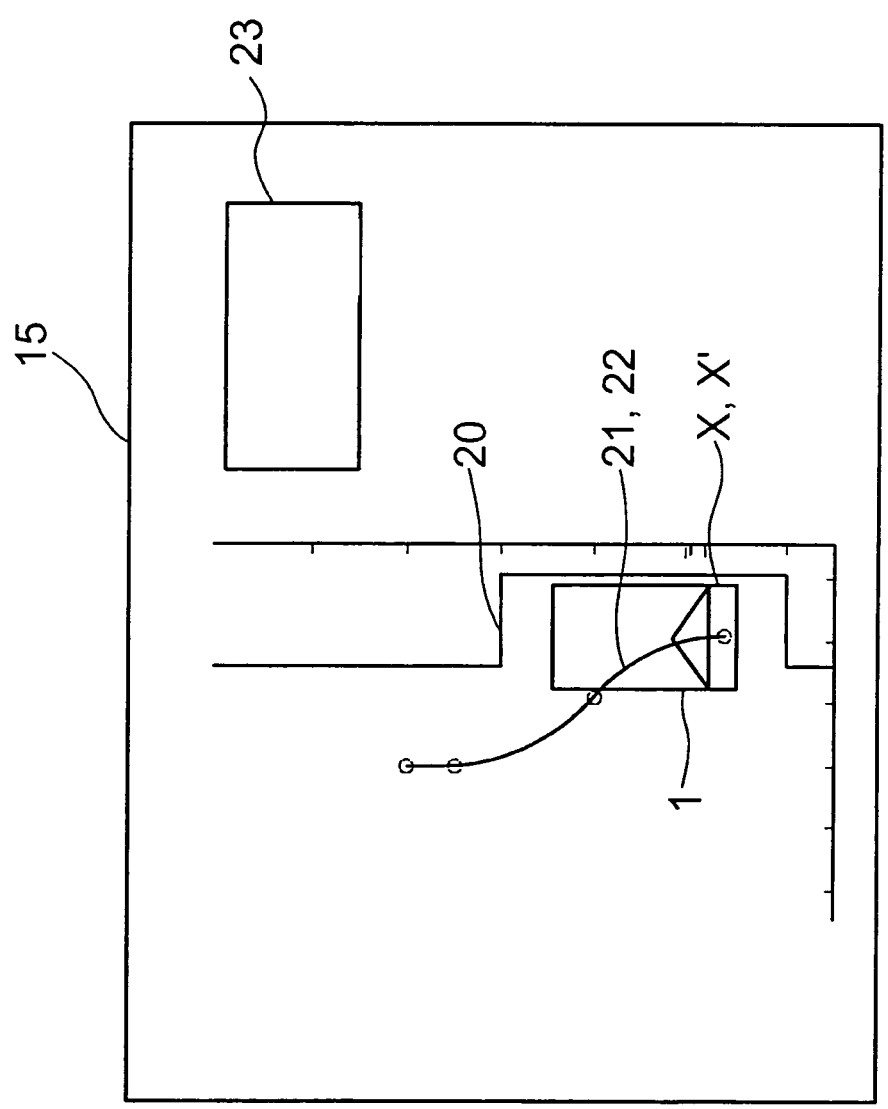
FIG. 8 shows a display indication following the conclusion of a parking operation.

With the sounding of the latter signal tone or gong, motor vehicle 1 is correctly situated in the parking space. This is indicated to the driver as shown in FIG. 8 and is communicated by a message "PARKING OPERATION CONCLUDED" in text field 23. If necessary or if desired, the driver may then additionally straighten out the wheels.

If the parking space is very tight and the motor vehicle is very close to a vehicle adjacent to the rear of the vehicle, then the driver may be asked via device 11 to straighten out the wheels and drive forward a bit so that motor vehicle 1 comes to rest at the center of parking space 20.

The estimated parking path is represented alongside setpoint parking path 21 as a function of the current steering angle. The driver's task is to bring the estimated parking path and the setpoint parking path into superposition by steering.

Figure 9:
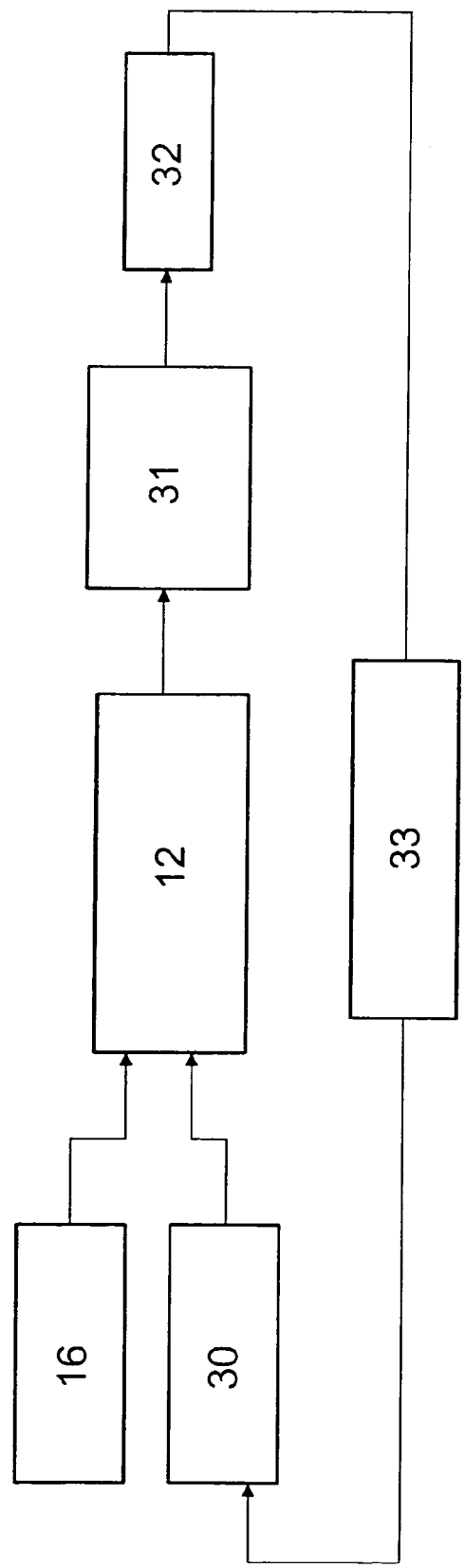
FIG. 9 shows a block diagram for setting an initial yaw angle.

The alignment of motor vehicle 1 regarding an optimum initial yaw angle with respect to the longitudinal extension of a parking space is now explained with reference to FIGS. 9 through 13. For this purpose, as shown in FIG. 9 by a block diagram, the dimensions of the respective parking space are ascertained using ultrasonic sensors 16, the measurement data 30 being analyzed in real-time in control unit 12 together with vehicle data 30, which may be supplied by a wheel pulse counter, by a steering angle sensor and the like. Using a so-called human machine interface 31, for example a display, the current yaw angle 32 is then communicated to the driver. This is then able to correct the steering angle in a step 33 such that vehicle data 30 are modified accordingly and motor vehicle 1 is able to assume the desired initial yaw angle.

In addition to the use of ultrasonic sensors 16, a yaw angle sensor of an electronic stability program (ESP) may be also be calibrated and used as additional vehicle information.

Figure 10:
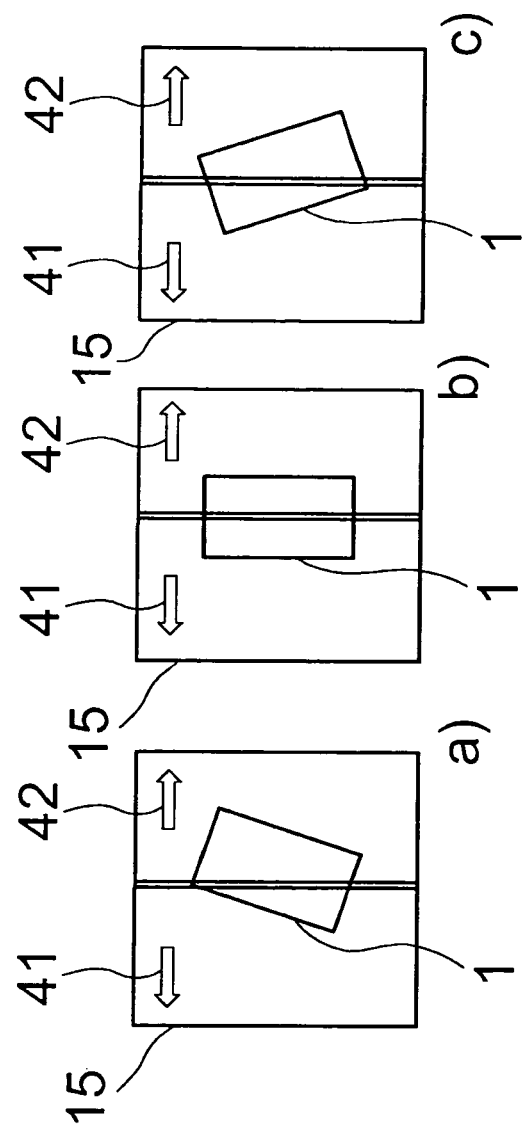
FIG. 10 shows a display during the setting of the initial yaw angle.

FIG. 10 shows the aids for driver 32 represented on display 15. In FIG. 10a, motor vehicle 1 deviates from a parallel position. This may be corrected by turning the steering wheel to the left. An arrow 41 pointing to the left flashes on in color to indicate the required maneuver. In FIG. 10b, motor vehicle 1 is in a position parallel to the extension of the parking space such that neither arrow 41 nor an arrow 42 used for requesting a right turn of the steering wheel flashes on. In FIG. 10c, motor vehicle 1 must be steered to the right in order to set a yaw angle of 0°. In order to prompt driver 32 to do this, arrow 42 pointing to the right flashes.

Figure 11:
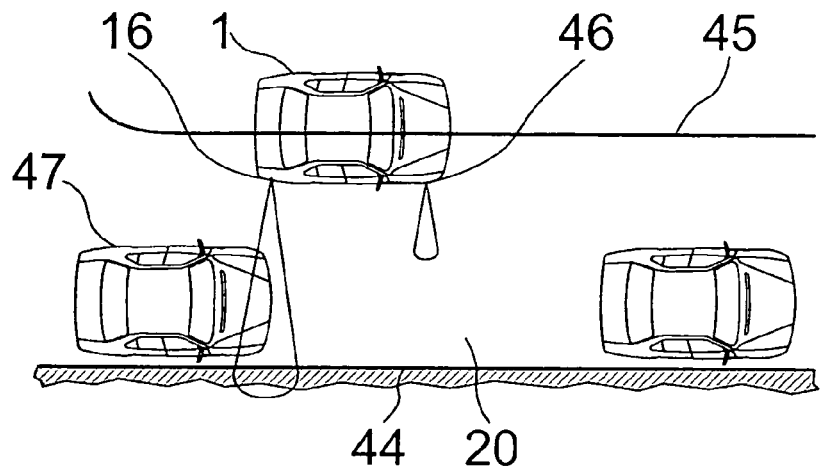
FIG. 11 shows a situation of measuring a parking space adjoining a curb.

FIG. 11 shows a situation in which a parking space 20 adjoining a curb 44 is measured. For this purpose, vehicle 1 drives past parking space 20 along a path 45, on which it is kept by the functionality represented in FIGS. 9 and 10, such that parking space 20 is measured with the aid of ultrasonic sensors 16 in the region of the rear axle of motor vehicle 1 and, if applicable, with the aid of ultrasonic sensors 46 in the region of the front axle of motor vehicle 1. First a motor vehicle 47 adjoining parking space 20 and then curb 44 are used to determine the yaw angle of the motor vehicle.

Figure 12:
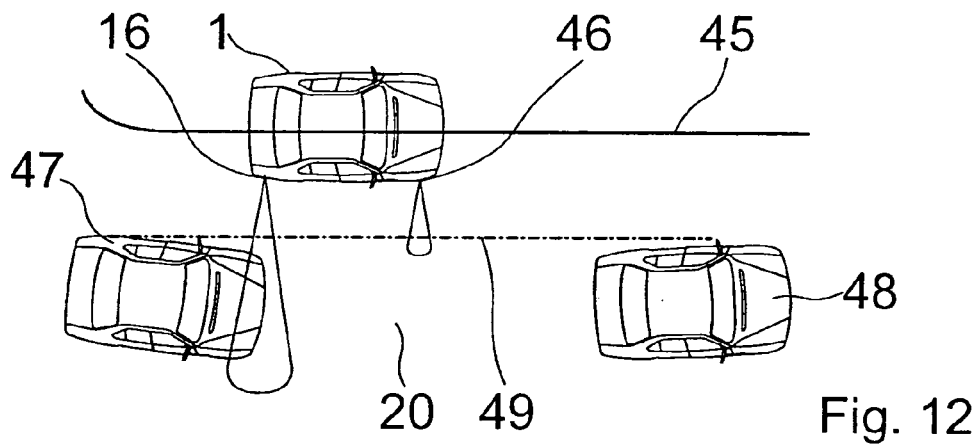
FIG. 12 shows a situation of measuring a parking space without a visible curb.

FIG. 12 depicts a situation, in which a parking space 20 is located between two motor vehicles 47 and 48, there being no curb in this case. Using its ultrasonic sensors 16 and 46, motor vehicle 1 finds its orientation in parked vehicles 47 and 48. If vehicles 47 and 48 are situated obliquely in their respective parking spaces, then a reference line 49 is produced using the points of vehicles 47 and 48 that jut out furthest into the street.

Figure 13:
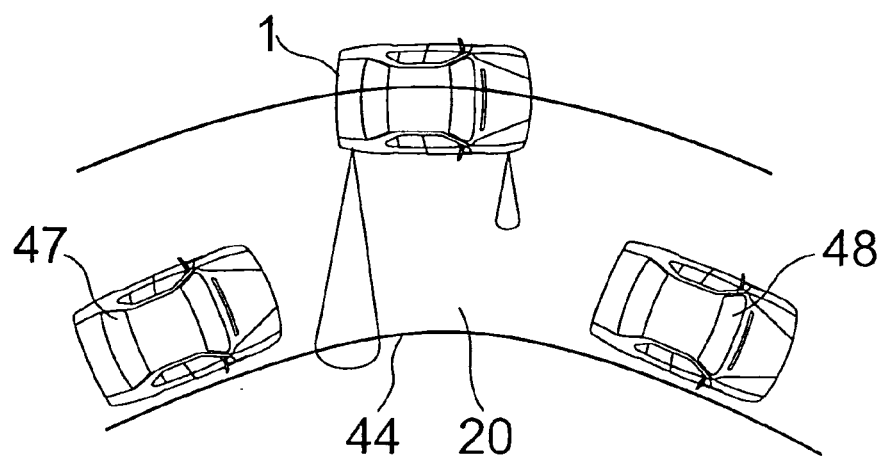
FIG. 13 shows a situation of measuring a parking space located in a curve.

FIG. 13 shows a special case of parking into a parking space 20 that is situated in a curve. Here motor vehicle 1 is aligned parallel to motor vehicles 47 and 48 parked adjacent to parking space 20 or parallel to a curb 44, parallel in this case meaning that a constant distance is maintained with respect to obstacle-constituting motor vehicles 47 and 48 or to curb 44.

What is claimed is:

1. A method for providing an assisted parking of a motor vehicle into a parking space, comprising:

specifying an initial yaw angle of the motor vehicle with respect to an extension of the parking space when passing the parking space;

approaching the parking space;
measuring the parking space using sensors situated on the motor vehicle;
calculating a setpoint parking path;
indicating the setpoint parking path on a display; and
indicating an actual parking path on the display such that the actual parking path may be adapted to the setpoint parking path.

2. The method as recited in claim 1, further comprising:
specifying on the display a driving maneuver required for maintaining the setpoint parking path.

3. The method as recited in claim 1, wherein: the measured parking space, the actual parking path, and the setpoint parking path are represented on the display as a schematic top view.

4. The method as recited in claim 1, wherein the display includes a display of a navigation system.

5. The method as recited in claim 1, further comprising:
confirming a performed maneuver in at least one of an acoustic manner, a visual manner, and a haptic manner if the maneuver is performed correctly.

6. The method as recited in claim 1, further comprising:
setting the initial yaw angle by providing to a driver at least one of a visual signal, an acoustic signal, and a haptic signal.

7. The method as recited in claim 1, wherein the initial yaw angle is set using an electronic control aid.

8. The method as recited in claim 1, wherein the specified initial yaw angle is 0°.

9. A device for providing an assisted parking of a motor vehicle into a parking space, comprising:
a sensor system for measuring the parking space;
a control unit;
a display;
a steering angle sensor;
a travel transducer, wherein a setpoint parking path and an actual parking path are indicated on the display; and
an arrangement for setting an initial yaw angle.

10. The device as recited in claim 9, further comprising:
an acoustic transducer.

11. The device as recited in claim 9, wherein the sensor system includes distance sensors for detecting an obstacle.

12. The device as recited in claim 9, wherein the arrangement for setting is active when passing the parking space.

13. The device as recited in claim 12, wherein the arrangement for setting includes at least one of visual signal device, an acoustic signal device, and a haptic signal device.

14. The device as recited in claim 12, wherein the arrangement for setting interacts with an electrical steering device.

15. The method as recited in claim 1, wherein the motor vehicle is oriented parallel to an alignment of the motor vehicles adjoining the parking space before a parking maneuver is started.

16. The method as recited in claim 1, wherein the motor vehicle is oriented parallel to an edge of the road before a parking maneuver is started.

17. The method as recited in claim 1, wherein the initial yaw angle is corrected if the specified initial yaw angle is not obtained.

18. The method as recited in claim 1, wherein the initial yaw angle is maintained when the specified initial yaw angle is obtained.

* * * * *

UNITED STATES PATENT AND TRADEMARK OFFICE
CERTIFICATE OF CORRECTION

PATENT NO. : 8,655,551 B2  Page 1 of 1
APPLICATION NO. : 11/628699
DATED : February 18, 2014
INVENTOR(S) : Danz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2140 days.

Signed and Sealed this

Twenty-ninth Day of September, 2015

Michelle K. Lee
*Director of the United States Patent and Trademark Office*